(12) United States Patent
Brillhart et al.

(10) Patent No.: US 8,929,807 B2
(45) Date of Patent: Jan. 6, 2015

(54) TRANSMISSION OF BROADCASTS BASED ON RECIPIENT LOCATION

(75) Inventors: David C. Brillhart, Orlando, FL (US); Christopher J. Dawson, Arlington, VA (US); Rick A. Hamilton, II, Charlottesville, VA (US); Anne R. Sand, Peyton, CO (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 13/220,905

(22) Filed: Aug. 30, 2011

(65) Prior Publication Data
US 2013/0052940 A1 Feb. 28, 2013

(51) Int. Cl.
| | | |
|---|---|---|
| H04B 5/00 | (2006.01) | |
| H04W 24/00 | (2009.01) | |
| H04B 7/00 | (2006.01) | |
| G08B 3/10 | (2006.01) | |
| B60Q 1/22 | (2006.01) | |
| H04H 40/00 | (2008.01) | |
| H04L 12/18 | (2006.01) | |
| H04H 60/52 | (2008.01) | |
| H04H 20/63 | (2008.01) | |

(52) U.S. Cl.
CPC ............ *H04H 40/00* (2013.01); *H04H 20/63* (2013.01); *H04L 12/189* (2013.01); *H04H 60/52* (2013.01); *H04H 2201/70* (2013.01)
USPC ... 455/41.1; 455/456.1; 455/41.3; 340/384.7; 340/463

(58) Field of Classification Search
USPC .................................................. 455/456.5
See application file for complete search history.

(56) References Cited

U.S. PATENT DOCUMENTS

| | | | |
|---|---|---|---|
| 6,329,908 B1* | 12/2001 | Frecska ...................... 340/384.7 |
| 7,155,159 B1 | 12/2006 | Weinblatt et al. | |
| 7,492,913 B2 | 2/2009 | Connor et al. | |
| 7,860,995 B1 | 12/2010 | Singh et al. | |
| 7,917,082 B2 | 3/2011 | Goldberg et al. | |
| 8,653,970 B2* | 2/2014 | Hazzani ........................ 340/541 |
| 2005/0129254 A1* | 6/2005 | Connor et al. .................. 381/77 |
| 2007/0298827 A1* | 12/2007 | Hansson .................... 455/550.1 |
| 2008/0153537 A1* | 6/2008 | Khawand et al. .......... 455/550.1 |
| 2008/0226096 A1* | 9/2008 | Waddell et al. ................. 381/87 |
| 2009/0157410 A1* | 6/2009 | Donohoe ...................... 704/270 |
| 2009/0187936 A1* | 7/2009 | Parekh et al. ................... 725/25 |
| 2010/0111342 A1* | 5/2010 | Jacob et al. ................... 381/332 |
| 2010/0195812 A1 | 8/2010 | Florencio et al. | |

\* cited by examiner

*Primary Examiner* — Steven S. Kelley
*Assistant Examiner* — Andy Gu
(74) *Attorney, Agent, or Firm* — William E. Schiesser; Maxine L. Barasch; Keohane & D'Alessandro PLLC

(57) ABSTRACT

Embodiments of the present invention provide an approach for transmitting/broadcasting messages/content (e.g., audio) by routing such messages to an intended audience/recipient (s), and optionally applying audio preferences to broadcast characteristics. Specifically, embodiments of the present invention may receive a message/broadcast in a queue, and identify a set of intended recipients of the broadcast (e.g., based on the content therein). Once the intended recipients have been identified, a set of locations of the intended recipients may be determined. Based on the locations, at least one output device is selected (e.g., based on proximity of the output device(s) to the intended recipients). Thereafter, the broadcast may be transmitted to the intended recipients via the selected output device(s), while any associated audio preferences are applied. In one embodiment, if an intended recipient is listening to other content, such content may be muted and/or paused so that the transmitted broadcast may be heard.

16 Claims, 4 Drawing Sheets

TRANSMISSION OF BROADCASTS BASED ON RECIPIENT LOCATION

TECHNICAL FIELD

In general, embodiments of the present invention relate to content (e.g., audio and/or video) broadcasting. Specifically, embodiments of the present invention relate to the broadcasting of content (or routing thereof) to intended recipients based upon the recipient's location.

BACKGROUND

Many locations that accommodate individuals contain distributed audio output devices in order to entertain and/or inform their audience. Such audio systems, among other uses, may play music, broadcast commentary, or remain silent unless an important message must be broadcast. Current public address systems make all announcements to all persons present using all common speakers and broadcasting at full volume.

Making such announcements to everyone within a location causes all individuals to be interrupted for announcements that may not be relevant to them. In busy and/or noisy locations, this may cause annoyance to individuals that must hear messages that may not be relevant. Due to repeated non-relevant announcements, some individuals may "tune out" the announcements entirely, and, as such, miss out on information that actually is relevant to them. Such an approach can be ineffective.

SUMMARY

In general, embodiments of the present invention provide an approach for transmitting/broadcasting messages/content (e.g., audio) by routing such messages to an intended audience/recipient(s), and optionally applying audio preferences to broadcast characteristics. Specifically, embodiments of the present invention may receive a message/broadcast in a queue, and identify a set of intended recipients of the broadcast (e.g., based on the content therein). Once the intended recipients have been identified, a set of locations of the intended recipients may be determined. Based on the locations, at least one output device is selected (e.g., based on proximity of the output device(s) to the intended recipients). Thereafter, the broadcast may be transmitted to the intended recipients via the selected output device(s), while any associated audio preferences are applied. In one embodiment, if an intended recipient is listening to other content, such content may be muted and/or paused so that the transmitted broadcast may be heard.

A first aspect of the present invention provides a computer-implemented method for transmitting broadcasts based on a location of intended recipients, comprising: receiving a broadcast in a queue; identifying a set of intended recipients for the broadcast based on content of the broadcast; determining a set of locations of the set of intended recipients; selecting at least one output device for transmitting the broadcast based on the set of locations; and transmitting the broadcast to the set of intended recipients via the at least one output device.

A second aspect of the present invention provides a system for transmitting broadcasts based on a location of intended recipients, comprising: a memory medium comprising instructions; a bus coupled to the memory medium; and a processor coupled to the bus that when executing the instructions causes the system to: receive a broadcast in a queue; identify a set of intended recipients for the broadcast based on content of the broadcast; determine a set of locations of the set of intended recipients; select at least one output device for transmitting the broadcast based on the set of locations; and transmit the broadcast to the set of intended recipients via the at least one output device.

A third aspect of the present invention provides a computer program product for transmitting broadcasts based on a location of intended recipients, the computer program product comprising a computer readable storage media, and program instructions stored on the computer readable storage media, to: receive a broadcast in a queue; identify a set of intended recipients for the broadcast based on content of the broadcast; determine a set of locations of the set of intended recipients; select at least one output device for transmitting the broadcast based on the set of locations; and transmit the broadcast to the set of intended recipients via the at least one output device.

A fourth aspect of the present invention provides a method for deploying a system for transmitting broadcasts based on a location of intended recipients, comprising: providing a computer infrastructure being operable to: receive a broadcast in a queue; identify a set of intended recipients for the broadcast based on content of the broadcast; determine a set of locations of the set of intended recipients; select at least one output device for transmitting the broadcast based on the set of locations; and transmit the broadcast to the set of intended recipients via the at least one output device.

BRIEF DESCRIPTION OF THE DRAWINGS

These and other features of this invention will be more readily understood from the following detailed description of the various aspects of the invention taken in conjunction with the accompanying drawings in which.

Figure 1:
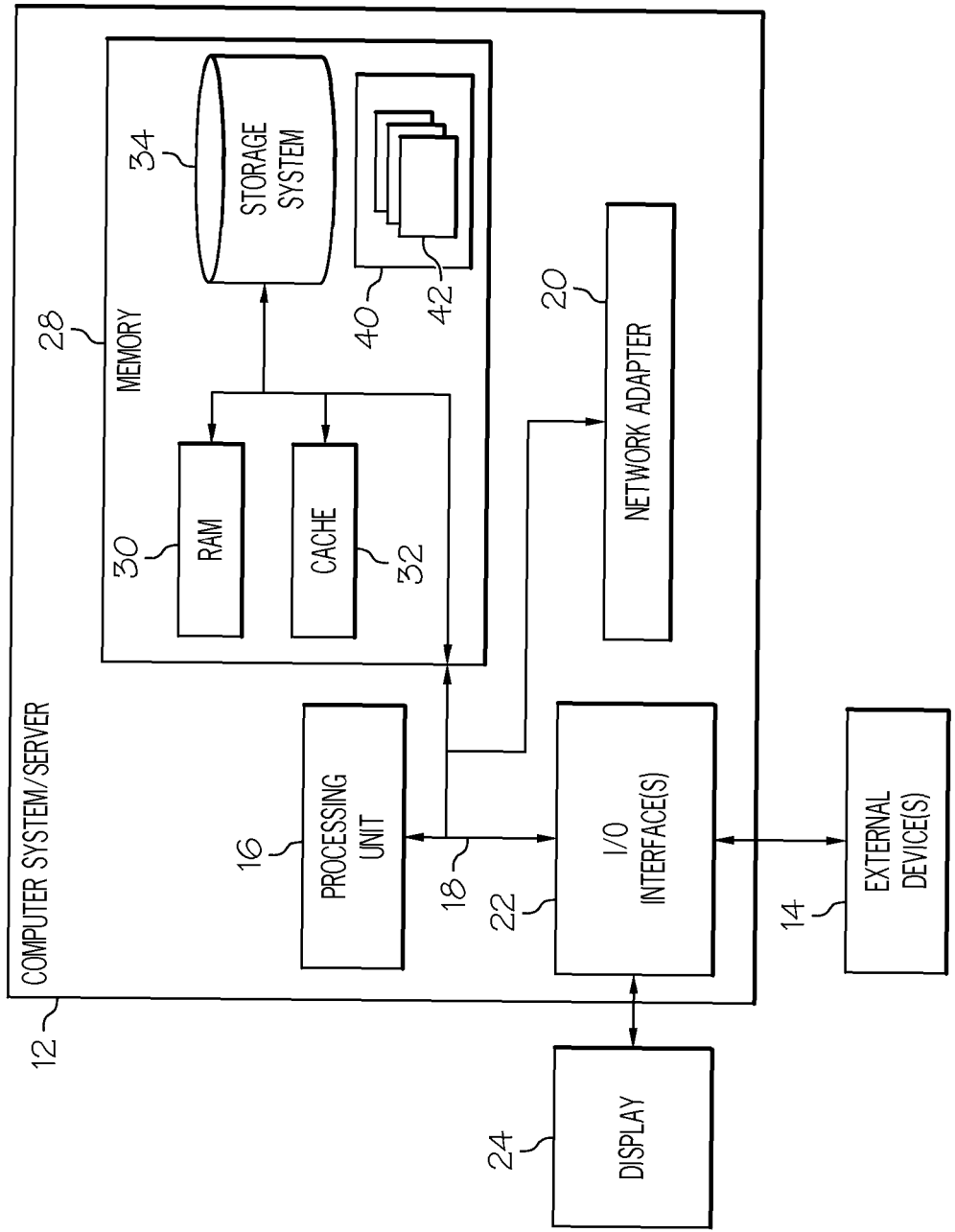
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Further-more, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention provide an approach for transmitting/broadcasting messages/content (e.g., audio) by routing such messages to an intended audience/recipient(s), and optionally applying audio preferences to broadcast characteristics. Specifically, embodiments of the present invention may receive a message/broadcast in a queue, and identify a set of intended recipients of the broadcast (e.g., based on the content therein). Once the intended recipients have been identified, a set of locations of the intended recipients may be determined. Based on the locations, at least one output device is selected (e.g., based on proximity of the output device(s) to the intended recipients). Thereafter, the broadcast may be transmitted to the intended recipients via the selected output device(s), while any associated audio preferences are applied. In one embodiment, if an intended recipient is listening to other content, such content may be muted and/or paused so that the transmitted broadcast may be heard.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Transmission routing program/utility 40, having a set (at least one) of program modules 42, may be stored in memory 28 by way of example, and not limitation, as well as an operating system, one or more application programs, other program modules, and program data. In general, transmission routing program 40 performs the function of the present invention as described herein. For example, transmission routing program 40 may compute a transmission routing total indicating a complexity of a proposed application migration, and provide various outputs (e.g., spreadsheets, charts, etc.) Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is understood that although this disclosure describes the broadcasting of audio content, any type of content (e.g., audio, video, or a combination thereof) could be accommodated hereunder. In any event, as indicated above, embodiments of the present invention provide an approach for broadcasting (e.g., audio) that routes information to the appropriate recipients/audience such that they are more apt to hear important messages, while simultaneously attempting to minimize disruption to collocated individuals and groups that have no interest in a particular message. All functionality discussed herein is typically enabled and/or implemented via transmission routing program 40 of FIG. 1. As such, transmission routing program 40 may enable and/or perform one or more of the following: receive a broadcast in a queue; identify a set of intended recipients for the broadcast based on content of the broadcast; determine a set of locations of the set of intended recipients; select at least one output device for transmitting the broadcast based on the set of locations; transmit the broadcast to the set of intended recipients via the at least one output device; and/or apply a set of preferences associate with the set of intended recipients, prior to the transmitting.

Figure 2:
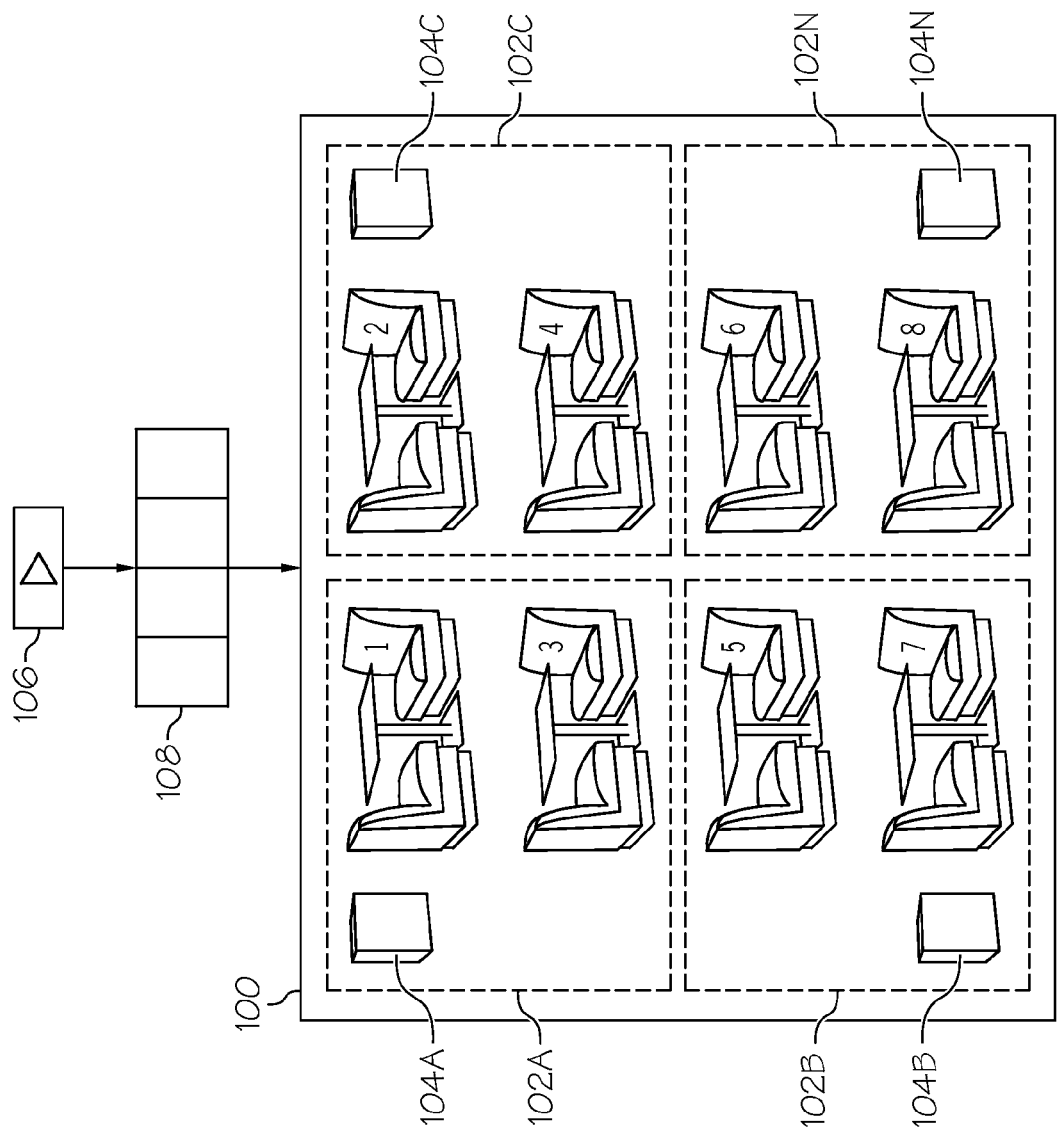
FIG. 2 depicts a graphical illustration of a static audience according to an embodiment of the present invention.
Figure 3:
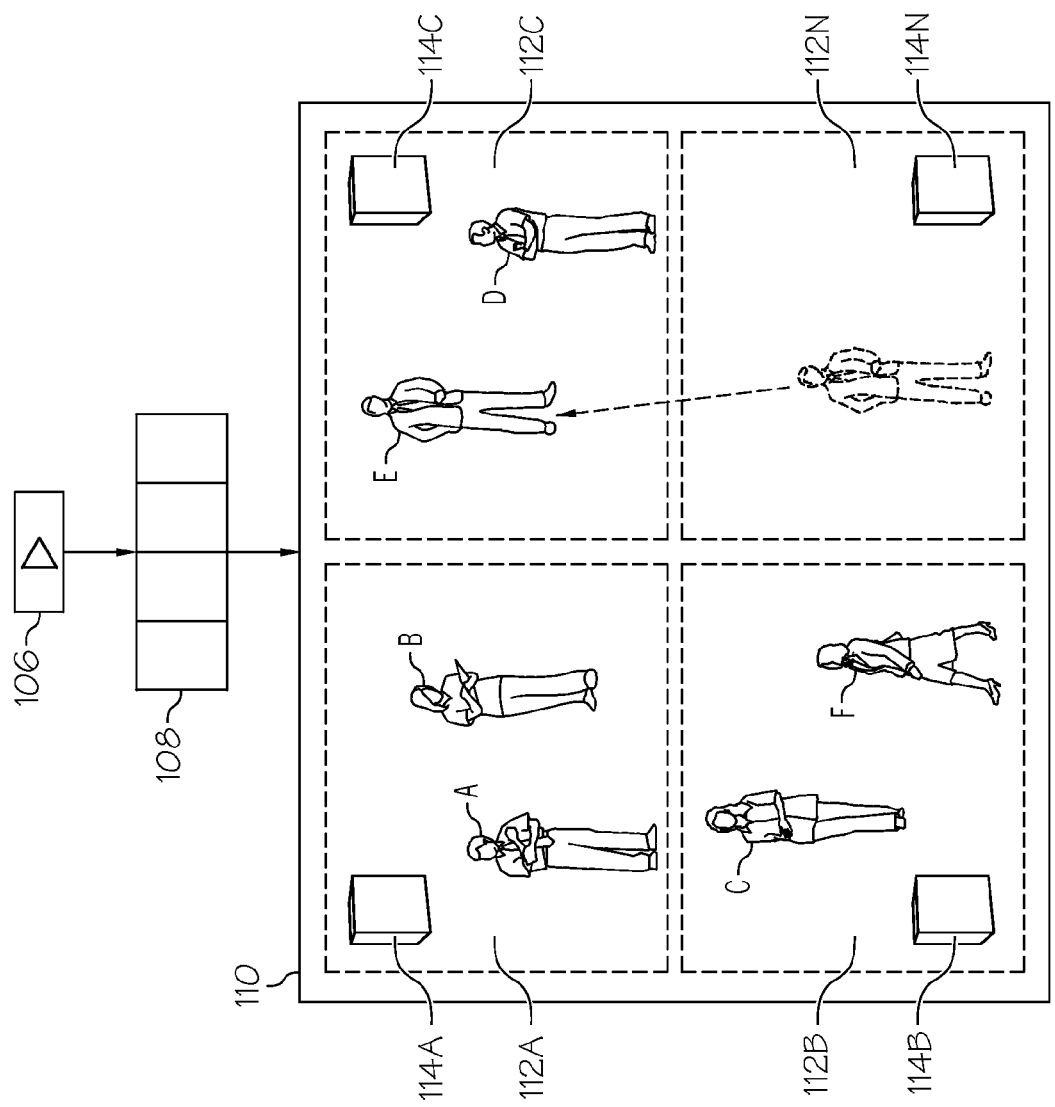
FIG. 3 depicts a graphical illustration of a mobile audience according to an embodiment of the present invention.

Each of these functions will now be discussed in additional detail in conjunction with FIGS. 2 and 3. Along these lines, there are multiple different scenarios addressed by the present invention, one in which the intended recipient is stationary, and another in which the intended recipient may be stationary or mobile. It should also be noted that a combination of these scenarios (e.g., a recipient that may be stationary at some times and mobile at other times), may result in hybrid combinations of the techniques discussed within this disclosure.

Static Recipient Example: Referring now to FIG. 2, an example of a stationary/static set of recipients is depicted. Given the first scenario of a static recipient, the location of the recipient is already known. As an example, a group of individuals may make a reservation at a restaurant and be assigned to a specific table. As shown in FIG. 2, a space 100 is divided into locations/regions 102A-N with each location 102A-N having an output device 104A-N (e.g., audio devices/speakers). In this example, space 100 comprises a restaurant with eight tables "1-8" across locations 102A-N. Assume that the "Smith" party makes a reservation and is assigned to table "3." As further shown, the restaurant seating is subdivided, for the purposes of message broadcasts, based on proximity to the given audio speaker 104A-N. In this example, each of the speakers 104A-B services two tables (as depicted by the dotted line boxes in FIG. 1). At this point, it is known to the restaurant and/or programmed into transmission routing program 40 (FIG. 1) that the Smith party is seated at static location table "3", which is serviced by audio speaker 104A. Along these lines, multiple methods are possible for subdividing the audio system as required by the embodiments of the present invention, such as: manual selection of broadcast devices 104A-N, automated selection of broadcast devices 104A-N based on manual or automated input (such as a restaurant reservation system), programming code in audio system software, programming in audio system firmware (micro-code), etc.

Regardless, a broadcast/message 106 (e.g., having audio and/or video content) is received and stored in a queue 108 for transmission. Continuing the example, assume that a phone call arrives in the restaurant for John Smith. A restaurant staff member may verbalize the following message into a "Would John Smith please come to the front desk for a phone call?" In such a case, the message is queued for broadcast.

A determination is made that Mr. Smith is at table 3 based on data stored as described above. Once location 102A has been identified, a determination is made that a transmission of broadcast 106 to Mr. Smith should occur via audio speaker 104A based on the position of table "3" within the audio system partitioning scheme. Optionally, audio preferences associated with Mr. Smith and/or the restaurant can be optionally applied, and the broadcast is then transmitted using audio speaker 104A. All other speakers 104B-N would maintain their current state (playing music, for example). In one embodiment, broadcast 106 would be transmitted only on speaker 104A. In another embodiment, broadcast 106 is transmitted on all speakers, but would be transmitted more loudly on speaker 104A than on speakers 104B-N. In another embodiment, the broadcast would be transmitted only on speaker 104A, after which if no response is received (perhaps after multiple attempts), the broadcast would be transmitted using additional, or all, audio speakers. In yet another embodiment, speaker 104A is on a rotating base and points directly towards the intended recipient (e.g., table "3" as opposed to table "1") prior to broadcasting the announcement, then rotates back to its "normal" position.

Mobile Recipients Example: Referring now to FIG. 3, an example of a set of mobile recipients "A-F" is depicted. Given this scenario, the location of the intended recipients "A-F" may be actively determined (continuously or when required). As an example, a group may be attending the same conference in room 110, and members of the group may be in the same or different locations 112A-N thereof. Continuing this example, FIG. 3 depicts six conference attendees "A-F" in conference room 110 equipped with audio output devices 114A-N. In a manner similar to the previous static recipients example, each audio output device could have an established broadcast range for optimization of output to intended recipient(s).

Further assume that a broadcast/message 106 is received and stored in queue 108 for transmission. A request is then made that Mr. Smith (labeled person "E" in FIG. 3) might be requested to meet another party member at an information desk. A conference staff member may speak into a microphone the message "Would John Smith please come to the south lobby information desk?" In such a case, the message is queued for broadcast.

A determination is then made that Mr. Smith is currently located in location 112N (speaker 114N), and is moving towards location 112C (speaker 114C). Multiple existing means may be used to track the specific location and movement of individuals including, but not limited to, radio-frequency identification (RFID) devices/tags (e.g., in a conference badge), global positioning satellite (GPS)-enabled devices, signal triangulation techniques, etc. Regardless, continuing this example, since Mr. Smith is the intended recipient for a queued message, his location and movement are actively and substantially continuously detected. Based on the locational tracing/detection, a determination may be made by transmission routing program 40 (FIG. 1) that a broadcast message to Mr. Smith should use audio speaker number 114N and/or 114C based on the current position of Mr. Smith within the audio system partitioning scheme. Once the audio device(s) have been selected, audio preferences can be optionally applied. Thereafter, broadcast 106 is transmitted using audio speaker number 114N, and all other speakers may maintain their current state (e.g., playing music, playing the conference content, etc.), and, as Mr. Smith moves into speaker zone 112C, a subsequent broadcast or a repeat of the same broadcast 106 could then be broadcast using speaker 114C. In one embodiment, broadcast 106 would be transmitted only on speaker 114N or 114C. In another embodiment, broadcast 106 could be transmitted on all speakers 114A-N, but could be broadcast more loudly on speaker 114C and/or 114N. In another embodiment, broadcast 106 could be transmitted only on speaker 114C or 114N, after which, if no response is received (perhaps after multiple attempts), broadcast 106 could be transmitted using additional, or all, audio speakers 114A-N. In yet another embodiment, speakers 114A-N can be positioned on a rotating base and point directly towards the intended recipient(s) prior to broadcasting the announcement, then rotate back to a "normal" position.

It is further understood that under any of the embodiments of the present invention, user preferences and/or location-based preferences for hearing audio may be considered. In such an embodiment, users and/or their preferences may be self-enrolled or be enrolled by others. Self-enrollment allows the user to select audio and preferences. Audio characteristics may be customized per user's preference or environment. This includes volume, voice used, tone, language, etc. For example, a particular user may prefer that audio optimized for them be announced using a quiet, female voice in Spanish. In another example, it is determined that the side of the room that a given user is on is very noisy at a point in time, so announcements to them will be louder to ensure the user hears it. If a user hears a portion of audio broadcast louder than other audio, it gives the user the indication that it is meant for him/her. Audio may be preceded by a customized tone to indicate which user it is intended for.

Illustrative Use case Scenarios

A. Corporate Meeting Centers

1. Many members of a corporation are gathered in a conference center for a strategy session.

2. Users wear identification (ID) badges with RFID tags.

3. User movement within the center is followed via the RFID tags.

4. Audio output devices are located in many locations throughout the center for broadcasting.

5. Users are assigned to groups based on their strategy subgroup.

6. Some announcements are appropriate for all attendees, but other announcements are relevant to specific individuals or subgroups.

7. Announcements targeted to a subgroup are tagged and are broadcast on audio devices in proximity to the intended subgroup.

8. The strategy session is attended by only one corporate Vice President (VP).

Announcements tagged as having strategic importance are broadcast on the audio devices in proximity to the relevant subgroups and the VP.

Announcements tagged as specific to the VP are broadcast only on the audio devices in proximity to the VP. As users move around the center, their locations are detected and announcements are dynamically adjusted accordingly.

B. Airports

1. Users are issued boarding passes with embedded RFID tags.

2. The RFID tags are detected by RFID readers, thus determining the real-time location of the boarding pass within the airport as the user moves about to airport.

3. In one embodiment, in order to ensure the user's privacy, only the flight information is stored and detected by the RFID system (personal identification data is not).

4. The airport is aware of the locations for passengers on flight 123 from location "A" to location "B", for example.

5. An announcement is made for the initial boarding call for this flight.

6. The current location of all interested parties is determined.

7. The announcement is broadcast only on, or more loudly on, speakers in proximity to the passengers of this specific flight.

8. The announcement is broadcast more quietly, or not at all, on speakers not in proximity to the intended passengers, therefore, not disrupting people who likely do not care about the information.

Figure 4:
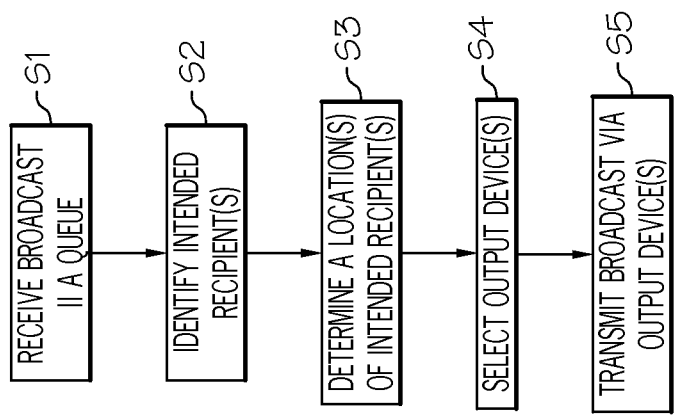
FIG. 4 depicts a method flow diagram according to the present invention.

Referring now to FIG. 4, a method flow diagram according to the present invention is shown. In step S1, a broadcast (e.g., audio, video, etc.) is received in a queue. In step S2, a set of intended recipients for the broadcast is identified based on content of the broadcast. In step S3, a set of locations of the set of intended recipients is determined (e.g., via RFID, GPS, etc). In step S4, at least one output device is selected for transmitting the broadcast based on the set of locations. In step S5, the broadcast is transmitted to the set of intended recipients via the at least one output device (e.g., while applying any preferences associated with the set of intended recipients).

While shown and described herein as a locational broadcast transmission solution, it is understood that the invention further provides various alternative embodiments. For example, in one embodiment, the invention provides a computer-readable/useable medium that includes computer program code to enable a computer infrastructure to provide transmission routing calculation for locational broadcast transmission functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide locational broadcast transmission functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for locational broadcast transmission. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for transmitting broadcasts based on a location of intended recipients, comprising:

issuing a boarding pass having an embedded radio frequency identification device (RFID) to each of a plurality of Passengers of an aircraft flight;

receiving a broadcast in a queue for broadcast through an airport from which the aircraft flight is to depart;

identifying a set of intended recipients for the broadcast based on content of the broadcast, the set of intended recipients being at least one of the plurality of passengers of the aircraft flight;

determining a first set of locations of the set of intended recipients in the airport using the embedded RFID;

selecting at least one first output device in the airport for transmitting the broadcast based on the first set of locations;

rotating the at least one first output device to point audio of the broadcast from an original direction to a direction of the set of intended recipients;

transmitting the broadcast to the set of intended recipients via the at least one first output device;

rotating the at least one first output device back to the original direction;

detecting, by the embedded RFID, movement of the set of intended recipients from the first set of locations to a second set of locations in the airport;

selecting at least one second output device in the airport for retransmitting the broadcast based on the second set of locations; and retransmitting the broadcast to the set of intended recipients via the at least one second output device.

2. The computer-implemented method of claim 1, the broadcast comprising an audio broadcast, the at least one first output device comprising at least one audio output device, and the at least one second output device comprising at least one second audio output device.

3. The computer-implemented method of claim 1, the determining comprising detecting a movement of the set of intended recipients.

4. The computer-implemented method of claim 1, further comprising applying a set of preferences associated with the set of intended recipients, prior to the transmitting.

5. The computer-implemented method of claim 1, the at least one first output device being selected based on a proximity of the at least one first output device to the first set of locations, and the at least one second output device being selected based on a proximity of the at least one second output device to the second set of locations.

6. A system for transmitting broadcasts based on a location of intended recipients, comprising:

a memory medium comprising instructions;

a bus coupled to the memory medium; and a processor coupled to the bus that when executing the instructions causes the system to:

issue a boarding pass having an embedded radio frequency identification device (RFID) to each of a plurality of passengers of an aircraft flight;

receive a broadcast in a queue for broadcast through an airport from which the aircraft flight is to depart;

identify a set of intended recipients for the broadcast based on content of the broadcast, the set of intended recipients being at least one of the plurality of passengers of the aircraft flight;

determine a first set of locations, in the airport, of the set of intended recipients using the embedded RFID;

select at least one first output device in the airport for transmitting the broadcast based on the first set of locations;

customize at least one audio characteristic of the broadcast based on an environment of the first set of locations, the at least one audio characteristic comprising a language;

transmit the broadcast, comprising the customized audio characteristics, to the set of intended recipients via the at least one first output device;

detect, by the embedded RFID; a movement of the set of intended recipients from the first set of locations to a second set of locations in the airport;

select at least one second output device in the airport for retransmitting the broadcast based on the second set of locations; and retransmit the broadcast, comprising the customized audio characteristics, to the set of intended recipients via the at least one second output device.

7. The system of claim 6, the broadcast comprising an audio broadcast, the at least one first output device comprising at least one audio output device, and the at least one second output device comprising at least one second audio output device.

8. The system of claim 6, the memory medium further comprising instructions for causing the system to detect a movement of the set of intended recipients.

9. The system of claim 6, the memory medium further comprising instructions for causing the system to apply a set of preferences associated with the set of intended recipients, prior to the transmitting.

10. The system of claim 6, the at least one first output device being selected based on a proximity of the at least one first output device to the set of locations, and the at least one second output device being selected based on a proximity of the at least one second output device to the second set of locations.

11. A computer program product for transmitting broadcasts based on a location of intended recipients, the computer program product comprising a computer readable storage media, and program instructions stored on the computer readable storage media, to:

issue a boarding pass having an embedded radio frequency identification device (RFID) to each of a plurality of passengers of an aircraft flight;

receive a broadcast in a queue for broadcast through an airport from which the aircraft flight is to depart;;

identify a set of intended recipients for the broadcast based on content of the broadcast, the set of intended recipients being at least one of the plurality of passengers of the aircraft flight;

determine a set of locations, in the airport, of the set of intended recipients using the embedded RFID;

select at least one output device in the airport for transmitting the broadcast based on the set of locations;

receiving a selection of a tone customized for indicating for which of the intended recipients the broadcast is intended; and transmit the broadcast, preceded by the customized tone, to the set of intended recipients via the at least one output device in the airport.

12. The computer program product of claim 11, the broadcast comprising an audio broadcast, and the at least one output device comprising at least one audio output device.

13. The computer program product of claim 11, the computer readable storage media further comprising instructions to detect a movement of the set of intended recipients.

14. The computer program product of claim 1, the computer readable storage media further comprising instructions to apply a set of preferences associated with the set of intended recipients, prior to the transmitting.

15. The computer program product of claim 11, the at least one output device being selected based on a proximity of the at least one output device to the set of locations.

16. A method for deploying a system for transmitting broadcasts based on a location of intended recipients, comprising:

providing a computer infrastructure being operable to:

issue a boarding pass having an embedded radio frequency identification device (RFID) to each of a plurality of passengers of an aircraft flight;

receive a broadcast in a queue for broadcast through an airport from which the aircraft flight is to depart;

identify a set of intended recipients for the broadcast based on content of the broadcast, the set of intended recipients being at least one of the plurality of passengers of the aircraft flight;

determine a set of locations, in the airport, of the set of intended recipients using the embedded RFID;

select at least one output device in the airport for transmitting the broadcast based on the set of locations, the at least one output device being selected based on a proximity of the at least one output device to the set of locations; and transmit the broadcast to the set of intended recipients via the at least one output device in the airport at a volume louder than transmission to output devices in the airport other than the selected at least one output device.

* * * * *